US005214523A

United States Patent [19]
Nito et al.

[11] Patent Number: 5,214,523
[45] Date of Patent: May 25, 1993

[54] FERROELECTRIC LIQUID CRYSTAL DISPLAY DEVICE HAVING MONOSTABILIZED STATE AS AN INITIAL STATE AND CONTINUOUS GRAY-SCALE

[75] Inventors: Keiichi Nito, Tokyo; Mayumi Miyashita, Kanagawa; Eriko Matsui, Kanagawa; Seiichi Arakawa, Kanagawa, all of Japan

[73] Assignee: Sony Corporation, Tokyo, Japan

[21] Appl. No.: 691,786

[22] Filed: Apr. 26, 1991

[30] Foreign Application Priority Data

Apr. 28, 1990 [JP] Japan .................. 2-112728
Jan. 28, 1991 [JP] Japan .................. 3-025131

[51] Int. Cl.$^5$ ............................................. G02F 1/137
[52] U.S. Cl. ........................................ 359/100; 359/76; 359/78; 359/90; 359/104; 252/299.01
[58] Field of Search ............ 359/56, 75, 76, 78, 359/91, 90, 100, 104; 340/784; 252/299.01

[56] References Cited

U.S. PATENT DOCUMENTS

| | | | |
|---|---|---|---|
| 4,892,393 | 1/1990 | Terashima et al. | 359/104 |
| 4,892,676 | 1/1990 | Sakurai et al. | 359/104 |
| 4,900,132 | 2/1990 | Bos | 359/100 |
| 4,906,401 | 3/1990 | Dübal et al. | 359/104 |
| 4,963,288 | 10/1990 | Saito et al. | 359/103 |
| 4,969,719 | 11/1990 | Bradshaw et al. | 359/63 |
| 4,997,264 | 3/1991 | Coulson | 359/63 |
| 5,029,987 | 7/1991 | Shinomiya | 359/39 |
| 5,061,044 | 10/1991 | Matsunaga | 359/75 |
| 5,061,047 | 10/1991 | Bradshaw et al. | 359/104 |
| 5,062,691 | 11/1991 | Tristani-Kendra et al. | 359/56 |
| 5,078,477 | 1/1992 | Jono et al. | 359/91 |
| 5,109,295 | 4/1992 | Sato et al. | 359/100 |
| 5,120,466 | 6/1992 | Katagiri et al. | 359/104 |
| 5,124,827 | 6/1992 | Davey | 359/76 |

FOREIGN PATENT DOCUMENTS

| | | |
|---|---|---|
| 0334628 | 9/1989 | European Pat. Off. . |
| 0444705A2 | 9/1991 | European Pat. Off. . |
| 0192724 | 8/1987 | Japan .................. 359/76 |
| WO90/16007 | 12/1990 | PCT Int'l Appl. . |

OTHER PUBLICATIONS

Patent Abstracts of Japan, vol. 12, No. 29 (P-660) 28 Jan. 1988, "Ferroelectric Liquid Crystal Optical Shutter", Aug. 11, 1987.
Journal of Physics D.Applied Physics, vol. 19, No. 3, Mar. 1986, Letchworth GB, Letter to the Editor-"Alignment of Chiral Smectic Liquid Crystals", Bristol, Great Britain.

Primary Examiner—William L. Sikes
Assistant Examiner—Tai V. Duong
Attorney, Agent, or Firm—Hill, Steadman & Simpson

[57] ABSTRACT

A liquid crystal display device having fast response characteristics and enabling analog gray-scale display is provided. The liquid crystal display device is formed of a liquid crystal material having the chiral smectic C phase. The projection component on the substrates of the axial direction of a cone delineated by a liquid crystal molecule, and the projection component on the substrates of the axial direction of the liquid crystal molecule itself, are adapted to be coincident with the processing direction for uniaxial orientation of the substrates, this state being monostabilized as the initial state. On application of an electrical field, the liquid crystal molecule is rotated along the cone and the apparent tilt angle as viewed on the substrate surface is continuously changed in accordance with the strength of the applied electrical field. The intensity of the transmitted light is increased continuously with increasing tilt angle to obtain the continuous gray-scale or analog gray-scale.

5 Claims, 6 Drawing Sheets $$\underset{K}{\xrightarrow{-30.6°C}} \underset{SmC^*}{\xrightarrow{67.3°C}} \underset{SmA}{\xrightarrow{82.2°C}} \underset{N^*}{\xrightarrow{100.1°C}} Iso$$
FIG. 8
FIG. 9 (a)
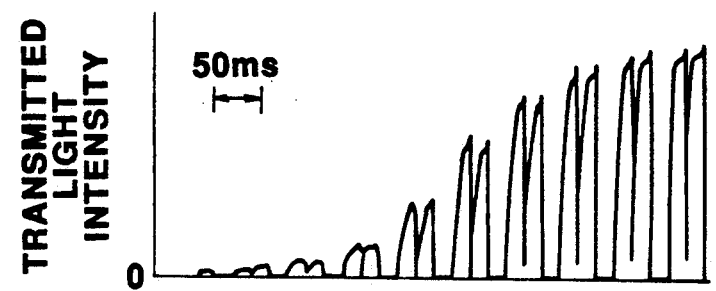
FIG. 9 (b)
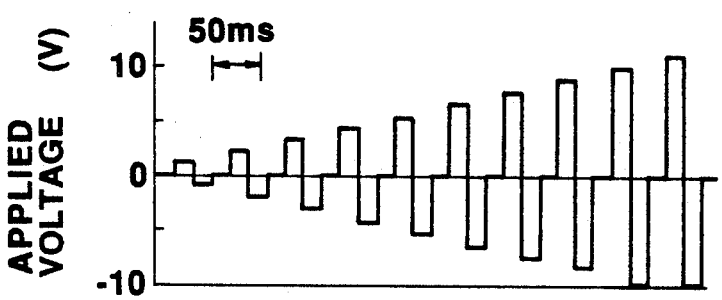
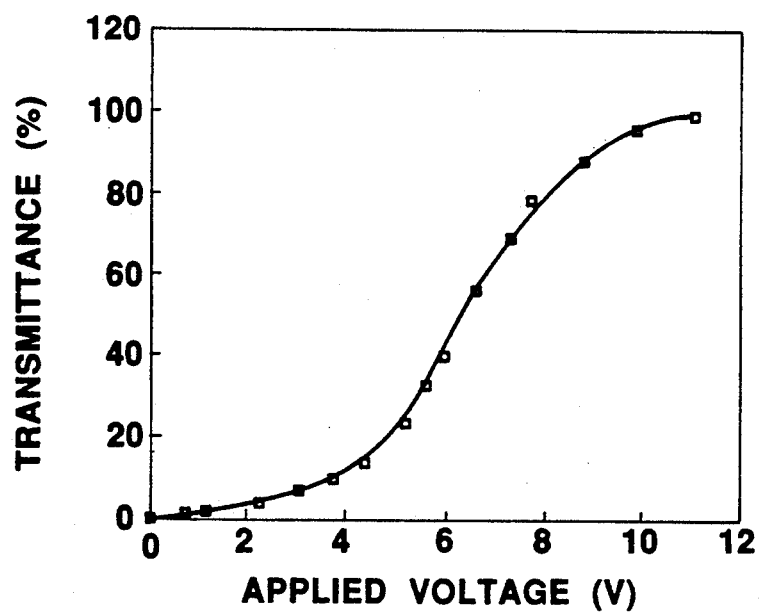
FIG. 10

FERROELECTRIC LIQUID CRYSTAL DISPLAY DEVICE HAVING MONOSTABILIZED STATE AS AN INITIAL STATE AND CONTINUOUS GRAY-SCALE

BACKGROUND OF THE INVENTION

This invention relates to a novel liquid crystal display device making use of a liquid crystal material having chiral smectic C phase.

As the tendency of development of liquid crystal display, multiplex driving of the STN mode or TFT active matrix driving of the TN mode has been predominant. However, for achieving a larger screen format or a higher definition, a device operating with a high speed becomes necessary.

Under this situation, a ferroelectric liquid crystal having the chiral smectic C phase is attracting attention as the liquid crystal material employed in the liquid crystal display devices. As the ferroelectric liquid crystal device, employing the ferroelectric liquid crystal and taking advantage of the light switching effects of the chiral smectic C phase, there is known a surface-stabilized ferroelectric liquid crystal (SSFLC) device, as proposed by N. A. Clark and S. T. Lagawall.

The SSFLC device is a liquid crystal device in which a liquid crystal component exhibiting the chiral smectic C phase (SmC* phase) is charged into a narrow gap cell. With the SSFLC device, the stable state is one in which axes of the liquid crystal molecules are aligned in a direction inclined by predetermined angles $\alpha$ and $-\alpha$ with respect to the direction of processing for substrate orientation. Bright and dark states are caused to appear by switching between these two bistable states.

Thus a problem is raised with SSFLC that it can be switched only between the two states of the bright and dark states and that, while it may function as a memory, it is unable to perform gray-scale display.

As a technique for achieving gray-scale display in a ferroelectric liquid crystal device, there has been proposed a method of controlling multidomains with different threshold voltages for achieving areal gradation. However, this method has a deficiency that the threshold values of the domains are discrete and continuous gray-scale cannot be achieved.

For overcoming the deficiency, a liquid crystal display cell has been proposed in Japanese Patent KOKAI publication 1-152430(1989), according to which an SmC* liquid crystal in which the relation between the pitch P and the cell gap d of the SmC* phase is given by d/p>5, that is in which p<0.4 $\mu$m for d=2 $\mu$m, is employed, the helical axis of the SmC* phase is aligned with the direction of processing for substrate orientation and the director (molecular axis) of the liquid crystal molecule forms a helix in the stable state. With this liquid crystal display cell, analog gray-scale of the television rate may be achieved by low voltage driving under the monostable state employing the effect of helical distortion of the ferroelectric liquid crystal.

However, in this case, a new problem is raised that a liquid crystal system with an extremely short helical pitch becomes necessary because of the fast response characteristics and the operating principle thereof, such that it is difficult to achieve uniform orientation.

Thus it is difficult with the conventional ferroelectric liquid liquid crystal device to achieved continuous gray-scale display (so-called analog gray-scaleal display) so that its practical usage is limited significantly.

In view of the above described state of the art, it is an object of the present invention to provide a liquid crystal display device in which continuous gray-scaleal display is feasible and in which orientation of the liquid crystal may be achieved easily.

SUMMARY OF THE INVENTION

In accordance with the present invention, there is provided a liquid crystal display device in which a pair of substrates processed for uniaxial orientation are arranged with the processing directions for orientation extending substantially parallel to each other, and in which a liquid crystal material having a chiral smectic C phase is charged into a space between these substrates, wherein the improvement resides in that the projection component on the substrates of the axial direction of a cone delineated by the liquid crystal molecule of a liquid crystal material having the chiral smectic C phase and the projection component on the substrates of the axial direction of the liquid crystal molecule itself are set so as to be in the same direction as the processing direction for orientation of the substrates, this state being monostabilized as the initial state.

BRIEF DESCRIPTION OF THE DRAWINGS

FIG. 8 is an illustrative view for illustrating the phase transition temperature of a liquid crystal material employed in the embodiment.

FIGS. 9(a) and 9(b) are diagrams illustrating the response waveform in the monostable cell.

FIG. 10 is a diagram showing the relation between the applied voltage and light transmittance in the produced liquid crystal cell.

DETAILED DESCRIPTION OF THE PREFERRED EMBODIMENTS

Figure 1:
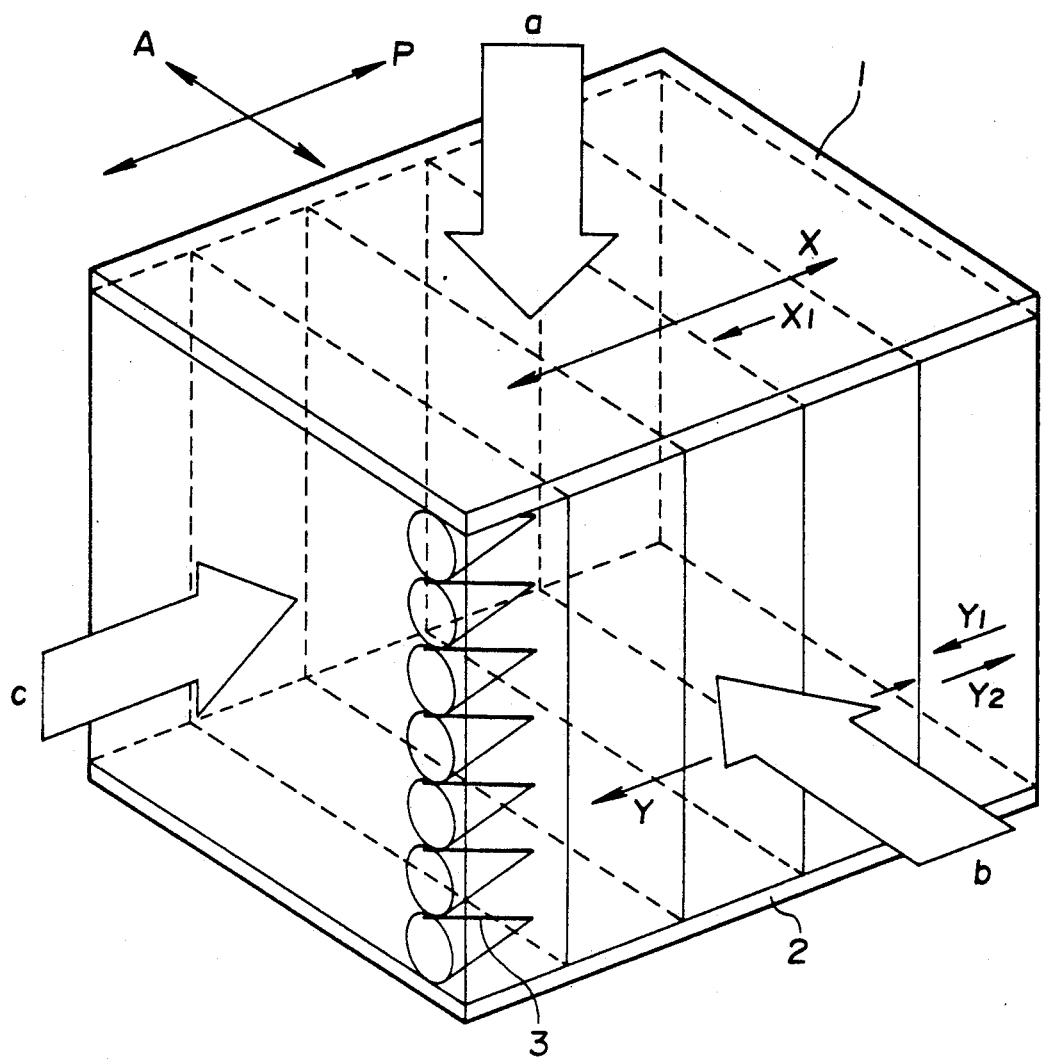
FIG. 1 is a perspective view showing diagrammatically a constructional example of a liquid crystal cell according to the present invention.

The basic structure of the liquid crystal display device of the present invention is shown in FIG. 1 and includes a pair of substrates 1 and 2 arranged in opposition to each other as a liquid crystal cell and a liquid crystal material arranged in a gap between the substrates 1 and 2. These substrates are previously processed by uniaxial orientation processing, such as rubbing or oblique evaporation. The liquid crystal material has the aforementioned SmC* phase.

The liquid crystal material may be ferroelectric or antiferroelectric, providing that it is capable of assuming the SmC* phase. However, in view of orientation properties, it is desirable that the material has a sufficiently long spiral pitch of the SmC* phase and high spontaneous polarization and exhibits the SmC* phase within a wide temperature range including the ambient temperature.

Therefor, most preferred is a composition obtained by mixing a well-known chiral liquid crystal or a chiral liquid crystal shown in the formula

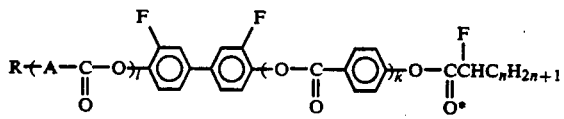

wherein R stands for an alkyl group having 6 to 15 carbon atoms, an alkoxy group or

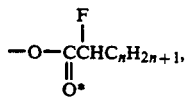

A stands for a benzene ring or a cyclohexane ring, k stands for 0 or 1 and n stands for an integer of from 2 to 15, with a non-chiral liquid crystal (host liquid crystal) such as fluorine-substituted derivatives of tricyclic esters, phenyl pyrimidine or phenyl benzoate.

Above all, for stably providing a monostable structure, it is preferred to employ phenyl pyrimidine liquid crystals or fluorine-substituted derivative of tricyclic esters or mixture thereof is the non-chiral liquid crystal. Of these, phenyl pyrimidine liquid crystal is most preferred for avoiding defects.

When using the mixture consisting of the chiral liquid crystal and the non-chiral liquid crystal, as described above, contrast or response time is affected by the amount of addition to the chiral liquid crystal of the non-chiral liquid crystal as the host liquid crystal. For maintaining the practical response time and realizing high contrast, it is preferred that the amount of addition of the chiral liquid crystal be in the range of 1 to 3 wt. %.

On the other hand, the substrate 1 and 2 are each obtained by forming a transparent electrode on a transparent substrate, applying a polyimide film thereon and rubbing the resultant substrates or forming a oblique evaporated film on the transparent electrode. The substrates 1 and 2 are arranged so that the directions of the uniaxial orientation processing thereof as indicated by arrows X and Y in FIG. 1 run substantially parallel to each other.

Rubbing is a technique of rubbing the polyimide film surface in one direction for forming minor grazings or scores thereon for imparting the orientation characteristics. The polyimide films may be arranged so that the rubbing directions are identical or parallel, or opposite to each other, or antiparallel. In the former case, the rubbing direction for the substrate 1 is $X_1$ and that for the substrate 2 is $Y_1$, whereas, in the latter case, the rubbing direction for the substrate 1 is $X_1$ and that for the substrate 2 is $Y_2$.

With the parallel disposition, the device tends to be a bistable cell capable of assuming only two-value states. Thus the antiparallel disposition is preferred.

In order to provide for monostability of the liquid crystal molecules, it is necessary that the distance between the substrates 1 and 2, that is the so-called cell gap, be set to an optimum value. Our experiments have revealed that the cell gap in the ranged of 1.2 to 3 μm is most preferred. With the cell gap in excess of 3 μm, the liquid crystal molecules tend to be bistable. Conversely, with the cell gap less than 1.2 μm, the tilt angle on voltage application is reduced and light transmittance is lowered. In order to provide for application of a high electrical field and to assure sufficient light transmittance, the cell gap in the range of 1.6 to 2.7 μm is preferred.

Figure 2:
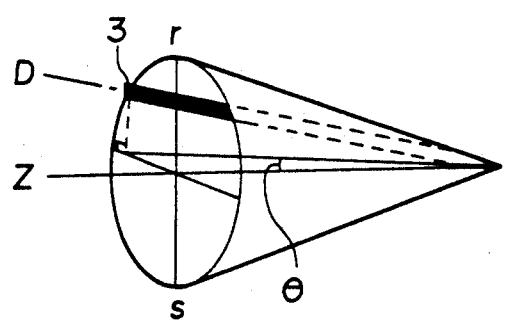
FIG. 2 is a diagrammatic view for illustrating a cone delineated by a liquid crystal molecule.

If the liquid crystal material having the SmC* phase is charged into the liquid crystal cell, the upper and the lower substrates 1 and 2 of which are previously processed by uniaxial orientation processing and arranged with the orientation thereof substantially parallel to each other, as mentioned above, and if the liquid crystal material has a layered structure, the normal line direction of the respective layers or the direction of the projection component thereof on the substrate coincides with the direction of processing for orientation. It is noted that, while the molecules 3 of the liquid crystals of the respective layers are revolved along the outer peripheral surface of a cone, as shown in FIG. 2, the axial direction Z of a cone delineated by the liquid crystal molecules 3 or the direction D of the projection component thereof on the substrates similarly coincides with the aforementioned direction of processing for orientation. That is, each liquid crystal molecule 3 is stabilized on a point r or a point S on the circumference of a cone.

Thus the liquid crystal display device of the present invention, while taking advantage of the stabilization effect of the liquid crystal molecules on the substrate surface, is neither bistable nor half-stable, that is stable only at one side of bistability, but is monostable in the intermediate states.

The liquid crystal display device of the present invention, when viewed from the normal line direction of each of the substrates 1 and 2, the directions of processing of uniaxial orientation of the substrates 1 and 2, the axial direction Z of a cone delineated by a liquid crystal molecule 3 itself and the direction D of the director of the liquid crystal molecule 3 coincide with one another.

If, with the directions of polarization of a pair of polarizing elements, that is an analyzer and a polarizer having the directions of polarization A and P, respectively, remaining normal to each other, the direction of polarization of one of the polarizing elements is coincided with the aforementioned direction of processing for orientation, the light is not transmitted, and the black level in obtained.

Conversely, on application of the electrical field, the director of the liquid crystal molecule 3 is revolved along the cone and tilted continuously towards right or left in an analog fashion depending on the strength of the electrical field or polarity, so that the continuous or analog gray-scale is obtained.

Although the driving voltage of the applied electrical field may have an arbitrary waveform, it is preferred that the voltage be alternately positive (+) and negative (−) and be of the amplitude modulated type in which the conditions for electrical neutrality be substantially satisfied.

Figure 3:
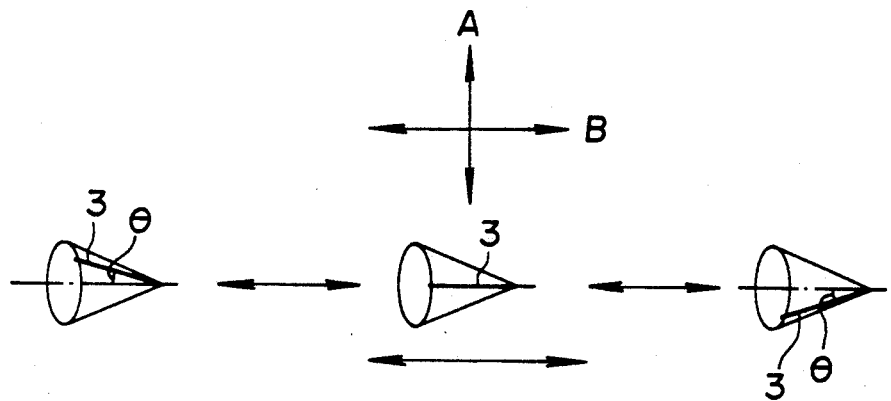
FIG. 3 is a diagrammatic view showing the behavior of a liquid crystal molecule as viewed from an arrow mark direction a in FIG. 1.
Figure 4:
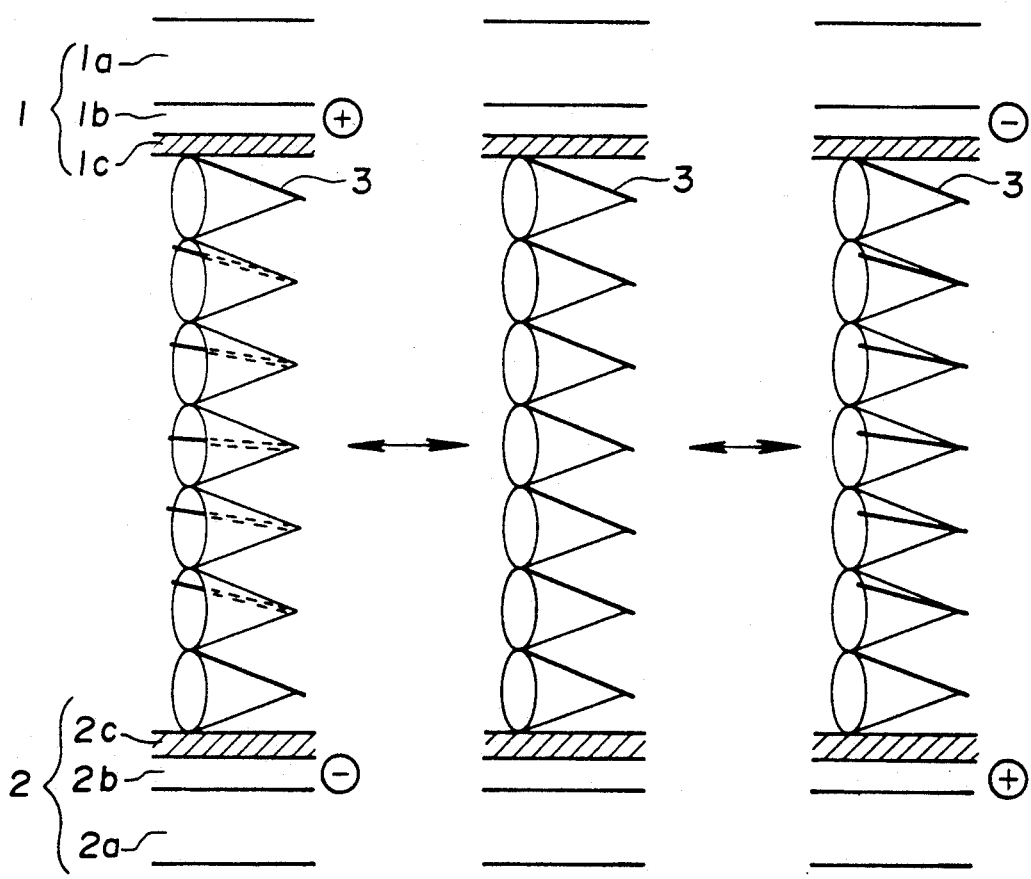
FIG. 4 is a diagrammatic view showing the behavior of a liquid crystal molecule as viewed from an arrow mark direction b in FIG. 1.
Figure 5:
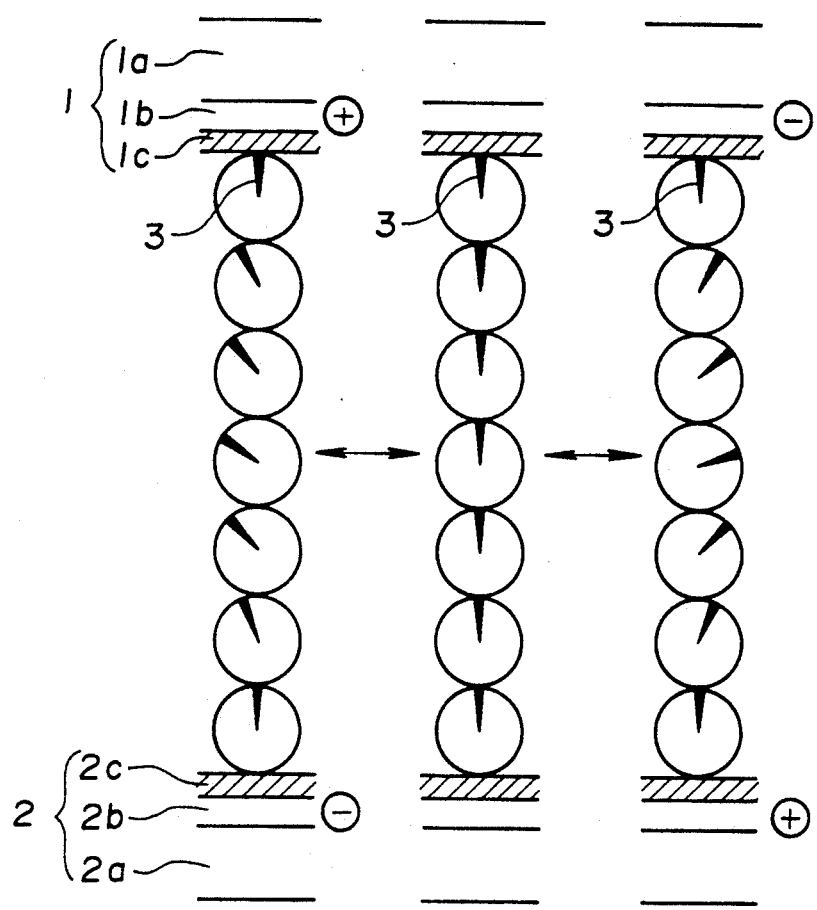
FIG. 5 is a diagrammatic view showing the behavior of a liquid crystal molecule as viewed from an arrow mark direction c in FIG. 1.

FIGS. 3, 4 and 5 illustrate the behavior of the liquid crystal molecule as viewed from the directions a, b and c in FIG. 1. In these figures, the substrates 1 and 2 are each constituted by glass plates 1a and 2a on which are formed transparent electrodes 1b and 2b and layers 1c and 2c, obtained by processing by rubbing, respectively.

If the electrical field is not applied, the direction D of the director of each liquid crystal molecule 3 coincides with the direction of processing by uniaxial processing of the layers 1c and 2c on the substrate 1 and 2. That is, as shown at the middle of FIG. 3, the direction D of the director of the liquid crystal molecule 3 is at the center of the projection plane of the cone.

This state represents the monostable state and, if the direction of polarization P of the polarizer is coincided with the directions X and Y of processing for orientation, and the direction of polarization A of the analyzer is set so as to be normal thereto, the light is not transmitted and the dark state results.

On the other hand, if the positive electrical field (+) and the negative electrical field (−) are applied to the transparent electrode 1b of the upper substrate 1 and the transparent electrode 2b of the lower substrate 2, respectively, the liquid crystal molecule 3 is rotated counterclockwise, with the direction of the rotation depending on the polarity of spontaneous polarization of the liquid crystal material. The further away the molecule is at this time from the boundary with the layers 1c and 2c, the layer becomes the apparent tilt angle $\theta$, possibly because a larger interaction and hence the anchoring effect operates at the boundary with the layers 1c and 2c.

It will be noted that the maximum value $\theta$max of the apparent tilt angle $\theta$ is determined by the strength of the electrical field and hence the maximum value $\theta$max of the tilt angle is changed continuously as a function of the strength of the electrical field. As a result, the average value $\theta_{AVG}$ of the apparent tilt angle of the liquid crystal cell, as viewed in its entirety, is naturally changed continuously.

The same applies for the case in which the negative electrical field (−) and the positive electrical field (+) are applied to the transparent electrode 1b of the upper substrate 1 and to the transparent electrode 2b of the lower substrate 2, respectively. In this case, as shown towards right in each figure, the liquid crystal molecule 3 is rotated clockwise, and the maximum value $\theta$max and the average value $\theta_{AVG}$ of the apparent tilt angle are again changed continuously.

At this time, the linearly polarized light from the polarizer is turned into the elliptically polarized light due to the phase difference caused by the tilt of the director of the liquid crystal molecule 3, so that the volume of the transmitted light from the analyzer is increased in accordance with the average value $\theta_{AVG}$ of the tilt angle. That is, the intensity I of the transmitted light in the liquid crystal cell is changed in accordance with the average value $\theta_{AVG}$ of the apparent tilt angle which is continuously changed in accordance with the strength of the electrical field, as shown by the formula $$I \propto I_0 \sin^2 2\theta$$

wherein $I_0$ stands for the intensity of the light prior to transmission through the cell, thereby producing an analog gradient.

If the external electrical field is removed from the state of application of the electrical field, the initial state is restored immediately due to the stabilization effect of the boundary and the internal electrical field in the liquid crystal.

Figure 6:
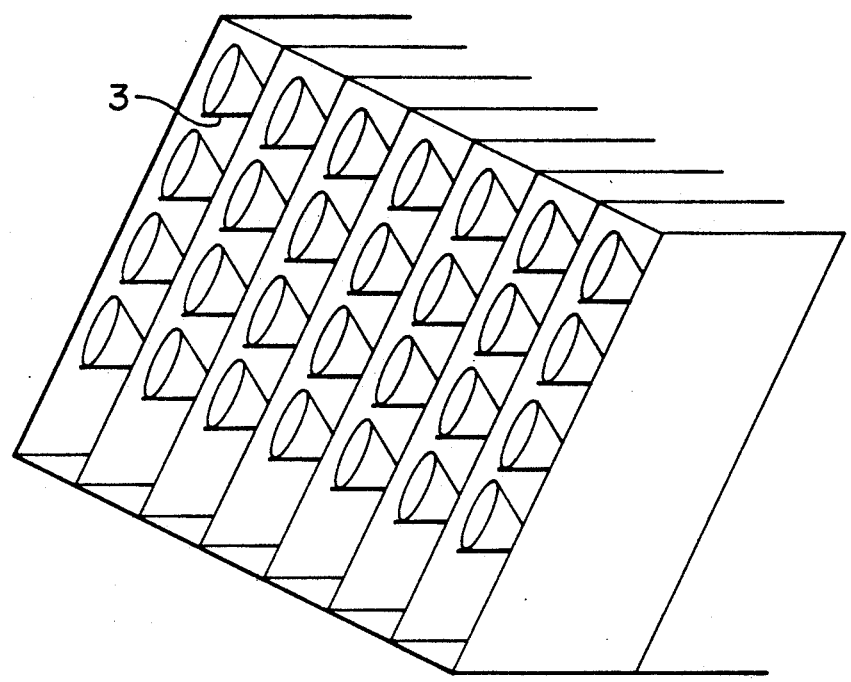
FIG. 6 is a diagrammatic view showing the arraying state of the liquid crystal molecules in the monodomain structure.
Figure 7:
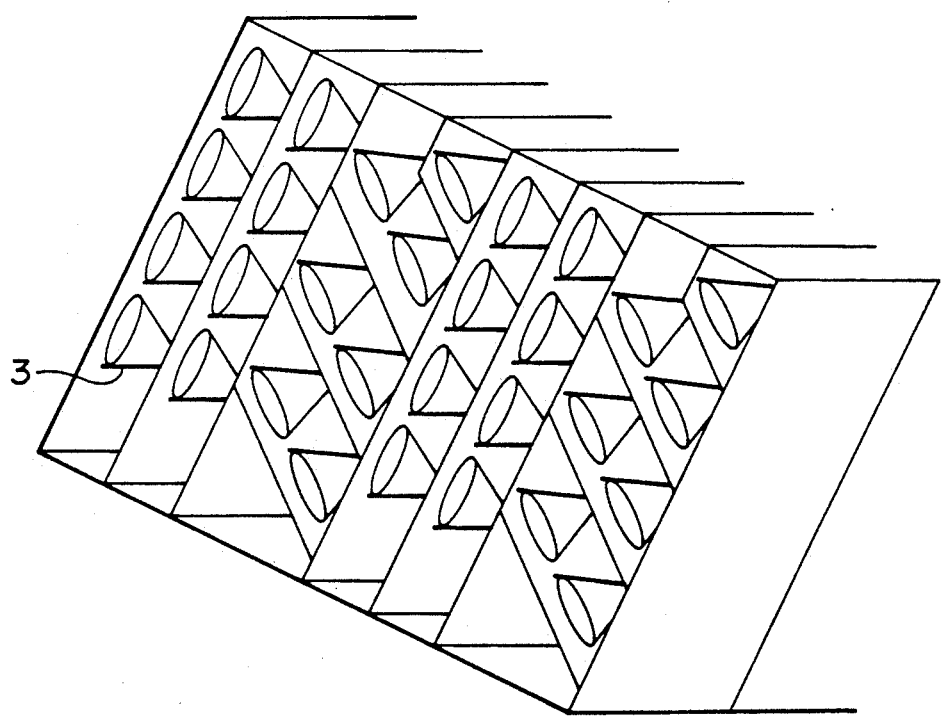
FIG. 7 is a diagrammatic view showing the arraying state of the liquid crystal director in the striped structure.

Meanwhile, with the liquid crystal cell having the above described structure, two models may be thought of as representing the state of orientation of the director of the liquid crystal molecule and the cone axis, as shown in FIGS. 6 and 7.

Thus, in FIG. 6, the tilt in each layer is uniform throughout the cell (monodomain), whereas, in FIG. 7, the tilt in each layer is reversed with the period of the cone axis at a predetermined pitch, such as, for example, a pitch of 2.25 $\mu$m (striped domain).

If simply the liquid crystal material is charged into a space between the substrates 1 and 2 having the processing directions for uniaxial orientation running substantially parallel to each other, the striped or streaked pattern, which is a highly regular streaked texture, is usually obtained. However, the monodomain structure of the liquid crystal display device is more preferred, since a linear gradient and a higher contrast may be obtained at a lower voltage.

For providing the liquid crystal material, charged into the space between the substrates 1 and 2, with a monodomain structure, it is sufficient if phenylpyrimidine liquid crystal is used as the non-chiral liquid crystal, and a high electrical voltage is applied. The application of the high electrical voltage disengages the streaked structure into the monodomain structure while the monostable state is maintained.

For example, if the liquid crystal material, in which the aforementioned phenylpyrimidine liquid crystal is used as the host liquid crystal and which is added to by 2 wt. % of the chiral liquid crystal, is used, the liquid crystal material is turned substantially into the monodomain structure by processing with a rectangular wave having the frequency of 700 Hz and an amplitude of ±45 to ±50 V.

However, a small amount of the streaked structure is left if solely the processing by an electrical field at or near the ambient temperature is performed. A more complete monodomain structure may be obtained by applying an electrical field (700 Hz, ±20 to ±50 V) at the temperature of the chiral nematic phase (N*) and cooling to the smectic A (SmA) phase and thence to the chiral smectic C (SmC*) phase under sustained application of the electrical field.

In any of these cases, the frequency of the applied electrical field plays an important role. Thus the monodomain structure is produced specifically in the neighborhood of the frequency of 700 Hz, while the frequency lower than 600 Hz has only poor effects.

With the liquid crystal display device of the present invention, the projection component on the substrate of the liquid crystal directors and the cone axes are arrayed along the processing direction for uniaxial processing, with the liquid crystal molecules being in the monostable state.

In the absence of the applied electrical field, this monostable state is maintained as the initial state, resulting in the black level.

Conversely, when the electrical field of a predetermined polarity is applied, the liquid crystal directors tend to be rotated clockwise along the cone surface. However, the liquid crystal directors are anchored near the boundary surface and tilted in the area spaced from the boundary surface. On application of an electrical field of an opposite polarity, the directors are rotated counterclockwise and the tilting direction is reversed.

The tilting angle is increased with increase in the strength of the applied electrical field, while the intensity of the transmitted light is increased with increase in the tilting angle.

Thus a continuous analog gray-scale may be realized by changing the strength of the electrical field.

If the external electrical field is removed from the state of application of the electrical field, the initial state may be restored quickly due to the stabilization effect of the boundary surface.

The above described liquid crystal display device of the present invention may be operated despite the longer SmC* phase pitch, as a principle, thus facilitating the orientation of the liquid crystal material.

Above all, if the monodomain state of orientation is achieved so that the tilt of the layers becomes uniform throughout the cell, a higher contrast as well as linear gradation in the low voltage region may be achieved.

EXAMPLES

The present invention will be explained with reference to the results of experiments.

Preparation of Liquid Crystal Cell

A transparent electrode (ITO) was provided to a glass plate, and the side of the glass plate thus provided with the transparent electrode was processed by a silane coupling agent. A polymic acid coating was applied by a spin coating method on the thus processed electrode side, and was baked into a polyimide film.

This polyimide film was rubbed ten times in a predetermined direction with a velvet cloth to give an oriented film. The film was about 200 Å thick and exhibited assymmetry with respect to the rubbing direction.

Two of the glass plates, on which the oriented films have been formed, were placed with the transparent electrodes facing each other and with the directions of processing by rubbing extending antiparallel to each other. A cell with a gap of 2 μm was prepared by using a UV curable adhesive in which micropearls 2 μm in diameter were dispersed previously.

As the liquid crystal material, a compound A shown by the formula (2)

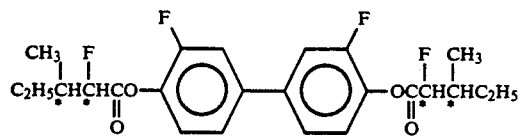

was used as a chiral component, and a compound B (tricyclic bifluorine base compound) shown by the formula (3)

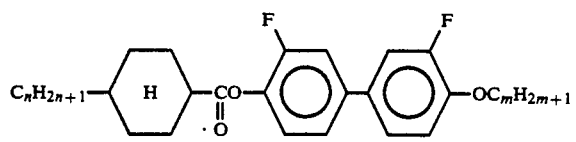

a compound C (phenylpyrimidine compound) shown by the formula (4)

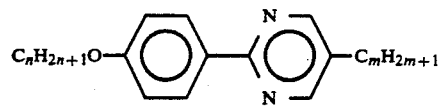

and a compound D (phenylbenzoate compound) having the formula (5)

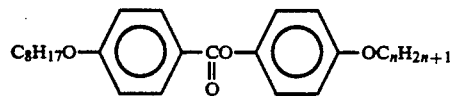

were used as a non-chiral component.

The non-chiral component composition was 58 wt. % of the compound (B), 22 wt. % of the compound (c) and 20 wt. % of the compound (C).

The proportions of the chiral and non-chiral components were set so that the ratio (chiral component A):(non-chiral components B+C+D)=10:90 in weight ratio.

This liquid crystal material exhibited a phase transition behavior shown in FIG. 8.

The pitch length at 25° C. of the SmC* phase was 2.9 μm, which is much longer than the value specified in, for example, Japanese Patent Kokai Publication 1-152430(1989). The spontaneous polarization of the liquid crystal material was 25 nC/cm² (25° C.).

The above described liquid crystal material was poured into a liquid crystal cell in the form of an isotropic liquid phase (Iso) at 110° C. in vacuo and cooled gradually to room temperature.

Observation of the thus prepared liquid crystal cell with a polarization microscope has revealed that the crystal cell exhibited a streaked structure extending in the rubbing direction of the oriented film. This streaked structure was highly regular and the liquid crystal molecules were arrayed in the streak direction.

That is, with the produced liquid crystal cell, the liquid crystal material presented a layered structure in which the projection component of the normal line directions of the respective layers or the directions of the cone axes on the substrates was identical with the rubbing direction in the oriented film and in which the projection component of the directors of the liquid crystal molecules on the substrate was also identical with the rubbing direction in the oriented film. The arraying state of the liquid crystal molecules along the rubbing direction was confirmed by the coincidence with the rubbing direction of the slow axis in birefringence measurements.

By arraying one of the polarizer or the analyzer, placed orthogonally to each other, such as the polarizer, parallel or perpendicular to the axis of orientation, the transmitted light may be intercepted substantially completely to establish the dark state.

Experiment on Operation

Analog gray-scale of the produced liquid crystal cell was examined by an driving waveform for evaluation. With the driving waveform for evaluation, gray-scale is achieved in the form of varying potentials of the applied voltage. It is in consideration of the electrically neutral conditions for the liquid crystal material that the applied voltage is alternately changed in polarity. Referring to FIGS. 9a and 9b, if a pixel of an active matrix is considered, each pixel is driven by two pulses, and electrical changes stores by a first-field pulse associated with a first field of a frame are electrically cancelled by a second-field pulse associated with a second field of the frame. Thus the pulse has a width of 1/60 second or 16.6 milliseconds. The purpose of the pulse with 0V between the pulses is to take account of the relaxation time from the tilt state of the directors of the liquid crystal molecules.

FIGS. 9a and 9b show the aforementioned driving waveform and the response waveform in the liquid crystal cell, respectively. It may be confirmed from FIG. 9 that the gradation may be achieved in the produced liquid crystal cell by voltage modulation. A fast falling at 0V is characteristic of this liquid crystal cell.

FIG. 10 and Table 1 illustrate the relation between light transmittance in the liquid crystal cell and the applied voltage. For convenience sake, the maximum light transmittance, that is the light transmittance on application of ±11V, is set so as to be equal to 100 percent.

TABLE 1

| applied voltage (V) | light transmittance (%) |
|---|---|
| 0 | 0 |
| ±0.7 | 1 |
| ±1.1 | 2 |
| ±2.2 | 4 |
| ±3.0 | 7 |
| ±3.7 | 10 |
| ±4.4 | 14 |
| ±5.2 | 24 |
| ±5.6 | 33 |
| ±5.9 | 40 |
| ±6.7 | 57 |
| ±7.4 | 70 |
| ±7.8 | 79 |
| ±8.9 | 89 |
| ±10.0 | 97 |
| ±11.1 | 100 |

It is seen from the above Table that light transmittance is changed with changes in the applied voltage to achieve the gray-scale display. Analog gradation could also be achieved by continuous amplitude modulation of the applied voltage.

As regards the switching time for each applied voltage, the response time on applying voltage application $\tau_{ON}$ was 1 to 8 milliseconds, whereas the response time from the state of voltage application to 0V $\tau_{OFF}$ was 0.6 to 3.3 milliseconds, thus indicating an extremely fast response. The particularly high response speed at the power off time is possibly due to the extremely high stability of the monostable state.

Since the response time in the ordinary TN liquid crystal is tens to hundreds of milliseconds, a display capable of operating at a speed markedly higher than the speed of the conventional TN type TFT (thin film transistor) is expected to be realized by applying the liquid crystal cell structure of the present invention to, for example, the TFT cell.

It has been shown hereinabove that analog gray-scale as well as the high speed operation may be achieved with the liquid crystal cell of the present invention. The present inventors have also investigated into the possible effect of the liquid crystal cell structure and the physical properties of the liquid crystal material on monostabilization. The following are discussions on the results of these investigations.

Investigations into the Direction of Precessing for Orientation

For clarifying the effect on monostabilization of structural factors of the polyimide boundary surface, investigations were made into the difference in the state of orientation which is caused by different combination of the processing directions for orientation, that is the parallel or anti-parallel processing directions, of a pair of substrates in the liquid crystal cell.

The construction of the liquid crystal cells and the liquid crystal materials were the same as those described previously. Different combinations of the parallel and antiparallel rubbing directions of the orientation films were used.

With parallel orientation, the orientation in the non-energized state was tilted by ±φ with respect to the rubbing direction, and a satisfactory bistable black level state was assumed, thus providing a bistable cell capable of assuming only binary states. The liquid crystal orientation structure at this time is assumed to be a so-called chevron structure.

In antiparallel orientation, the orientation in a non-energized state coincides with the rubbing direction, and the striped structure proper to monostability was observed. The gray-scale display is possible with the present liquid crystal, as illustrated in the above experiments on the operation. The liquid crystal orientation structure in the cell at this time is assumed to be a so-called bookshelf structure.

It may be said from above that the antiparallel oriented cell is preferred as the monostable cell.

Investigations into Optimum Cell Gap

In the polyimide boundary surface, not only the effects in the rubbing direction, but also those by anchoring, are thought to be operating. That is, since the interaction which the polyimide boundary surface has on the liquid crystal molecule is thought to be decreased with increase in the spacing from the boundary surface, the degree of monostability may be controlled by changing the cell gap.

Thus, liquid crystal cell samples with the cell gap changing between 0.8 μm and 6.3 μm were prepared, and investigations were made into transmittance and monostable switching properties in each cell.

The construction of the produced liquid crystal cells and the liquid crystal materials employed were again the same as those described previously. The cell gaps were 0.8 μm, 1.2 μm, 1.65 μm, 1.8 μm, 2.0 μm, 2.1 μm, 2.7 μm, 3.0 μm, 3.9 μm and 6.3 μm.

It was seen from the results of the investigations that the liquid crystal cell with the cell gap of not more than 3 μm exhibited satisfactory orientation of the liquid crystal molecules and was free of twist, with the exception that the cell with the cell gap of 0.8 μm and the cell with the cell gap of 1.2 μm had small tilt angles on applying voltage application and only low light transmittance, although they exhibited a satisfactory black level.

The switching properties of the liquid crystal cells were also analyzed by using the driving waveform for the monostable liquid crystal molecules. It was seen that the cells with the cell gaps of 0.8 μm and 3.0 μm exhibited monostability and, with the cell gap as large as 3.9 or 6.9 μm, the cells exhibited bistability.

Thus the response time was measured of the liquid crystal cells with the cell gaps of 1.65 to 3.0 μm. The results are shown in Table 2.

TABLE 2

| applied electrical field | | cell gap d/μm | | | | | |
|---|---|---|---|---|---|---|---|
| | | 1.65 | 1.8 | 2.0 | 2.1 | 2.7 | 3.0 |
| 2.5 V/μm | $\tau_{up}$/ms | 1.5 | 5.5 | 3.0 | 3.0 | 1.5 | 1.5 |
| | $\tau_{down}$/ms | 1.5 | 3.0 | 3.0 | 4.0 | 2.0 | 2.5 |
| 5 V/⁻m | $\tau_{up}$/ms | 1.5 | 2.5 | 2.0 | 1.5 | 1.5 | — |
| | $\tau_{down}$/ms | 2.0 | 3.0 | 2.0 | 3.5 | 2.0 | |

With the gap size range, shown in the above Table 2, the rising response time slightly depends on the gap under a low electrical field and approaches a constant value under a high electrical field. The falling response time remains constant without being dependent on the strength of the applied electrical strength, possibly due mainly to the binding force of the polyimide binding force.

Meanwhile, it has been found that, with the cell gap size of 3.0 μm, the molecular orientation shifts to bistability on applying high electrical field, so that, if the liquid crystal cell is to be used as a switching device, it is necessary that the cell gap be not more than 2.7 μm.

Effect of Non-Chiral Liquid Crystal

In the liquid crystal cell of the present invention the ferroelectric liquid crystal composition, employed as the liquid crystal material, is obtained by mixing chiral liquid crystals with non-chiral liquid crystals. Thus the effects of the non-chiral component on the monostability were investigated.

First, the non-chiral liquid crystals of the ternary system consisting of tricyclic difluorine (DFE), phenylpyridine (PPm) and phenylbenzoate (PE) were introduced into the antiparallel cell, and the striped structure similar to that of the previously produced liquid crystal cell was observed. That is, the striped structure was found to be ascribed not to the chiral liquid crystals, but to the non-chiral liquid crystals.

Investigations were further made into individual components. The results were as follows:

(a) DFE/PPm composition

Similarly to the case of DFE/PPm/PE composition, the striped structure of the same direction as the processing direction for orientation was observed.

(b) DFE composition

Although the degree of completion of the striped structure was low, comparable lines appeared.

(c) PPm composition

The degree of completeness of the striped structure was extremely high.

(d) PE composition

The striped structure was not observed and the liquid crystal molecules had a structure similar to that of the bistable structure.

It was thus seen that monostability appeared by the non-chiral components of the PPm and DFE while the chiral component was found to be unnecessary for the appearance of the monostable structure. PPm was found to suffer from only little effects and be suitable as the non-chiral component in the liquid crystal cell of the present invention.

However, it was found that the switching mode in which the stripes proper to the monostable structure moved was slight with solely these non-chiral components and that the presence of the chiral component was necessary for the appearance of the mode.

Effects of Addition of Chiral Liquid Crystals

Investigations were made into what effect were brought about into the structure and the opto-electrical properties of the monostable cell by the addition of the chiral component into the phenylpyrimidine liquid crystal (PPm) suffering from only small defects. The oriented film was of polyimide and the cell was anti-parallel. The added chiral liquid crystals were the above mentioned compound A.

The amount of addition of the chiral component was 0 to 5 wt. %. Observation of the cells by a polarization microscope revealed that the monostable striped structure suffering from only little defects was observed with the amount of addition of 0 to 3 wt. % of the chiral components.

If the chiral component was added in an amount in excess of 3 wt. %, the darkness of the black level was poor due to the defect that occurred during cooling after the charging of the liquid crystal material, and thus the contrast ratio was lowered.

Figure 11:
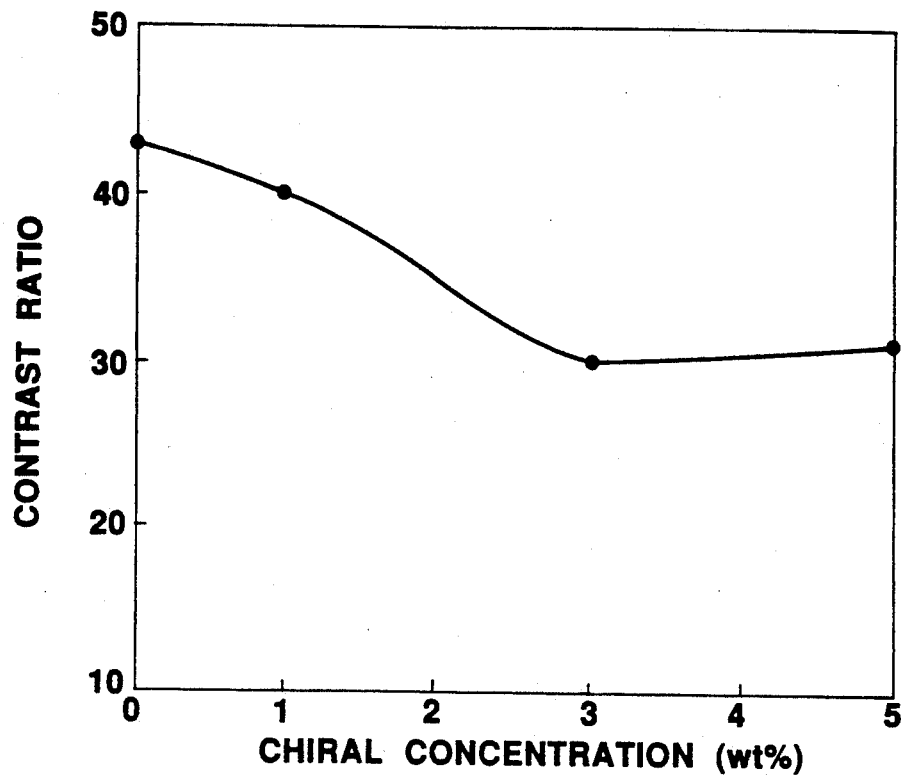
FIG. 11 is a diagram illustrating the chiral concentration dependency of the contrast ratio.

FIG. 11 shows the chiral concentration dependency of the contrast ratio. It may be seen from this that the amount of 3 wt. % or less of the chiral liquid crystals is preferred.

Further, electro-optical properties of the phenylpyrimidine liquid crystal composition were investigated while the concentration of the chiral component was changed. Addition of the chiral components resulted in the lowered response threshold voltage and the shorter response time. These properties are shown in Table 3.

TABLE 3

| chiral concentration (%) characteristics | 0 | 1 | 3 | 5 |
|---|---|---|---|---|
| saturation (V) | | | | |
| (transmittance 100%) | 14 | 10 | 5 | 4 |
| (transmittance 50%) | 10.5 | 3.5 | 0.9 | 1.5 |
| response time (ms) | | | | |
| $\tau_{ON}$ (3V) | 3.20* | 1.75 | 0.50 | 0.75 |
| $\tau_{OFF}$ (0V) | 2.20 | 1.25 | 1.25 | 1.00 |
| contrast ratio | 35–43 | 40 | 30 | 32 |
| black level (transmittance %) | 0.45 | 0.30 | 0.58 | 0.55 |

*The value is the measured value at 14 V because of the absence of response at 5 V.

While there was no response unless 7 V or more was applied with solely the non-chiral liquid crystal, driving turned out to be possible under the lower voltage of 1 V or less by addition of as small as 1 wt. % of chiral liquid crystal, such that light transmittance of 100% could be achieved with the applied voltage of 10 V. Further increase in the chiral component resulted in light transmittance of 100% with the applied voltage not more than 5 V.

The response time $\tau_{ON}$ was shorter with increase in the chiral component and reached 500 μsec with 3 wt. % of the chiral component, while a further reduction in the response time could not be achieved. The response time $\tau_{OFF}$, which is the response time on releasing the applied voltage, remained constant at ca. 1.0 to 1.25 msec with the amount of 1 wt. % or more of the chiral component.

It was found that, by considering the contrast ratio simultaneously, the amount of the chiral component of 1 to 3 wt. % was practically most convenient.

Meanwhile, the helical pitch of the ferroelectric liquid crystal composition, obtained upon addition of 3 wt. % of the chiral liquid crystals to the phenylpyrimidine liquid crystals, was 3 μm with the N* phase and 9.3 μm with the SmC* phase, while monostable driving could be achieved with the helical pitch of 9.3 μm or more, in a manner significantly different from the pitch conditions described for example in the Japanese Patent KOKAI Publication No. 1-152430(1989).

Turning of Striped Structure into Monodomain Structure

In an analog gray-scale display device taking advantage of monostability, a highly regular striped structure was formed on preparation of the monostable cell to display monostability. However, the contrast ratio was about 46 at the maximum. Thus, investigations were made into the effect of turning the striped structure into the monodomain structure on the possible improvement of the contrast ratio.

A ferroelectric liquid crystal composition obtained by adding 2 wt. % of the chiral liquid crystals to the phenylpyrimidine liquid crystals was introduced into the liquid crystal cell. The structure of the liquid crystal all employed was described in "Preparation of Liquid Crystal Cells".

Under this state, a highly regular striped structure was presented. However, the cell turned into the monodomain structure could be prepared by applying an electrical field of 700 Hz and 20 to 50 V at the temperature of the chiral nematic phase and cooling the structure to the smectic A phase and thence to the chiral smectic C phase under the continued application of the electrical field.

Figure 12:
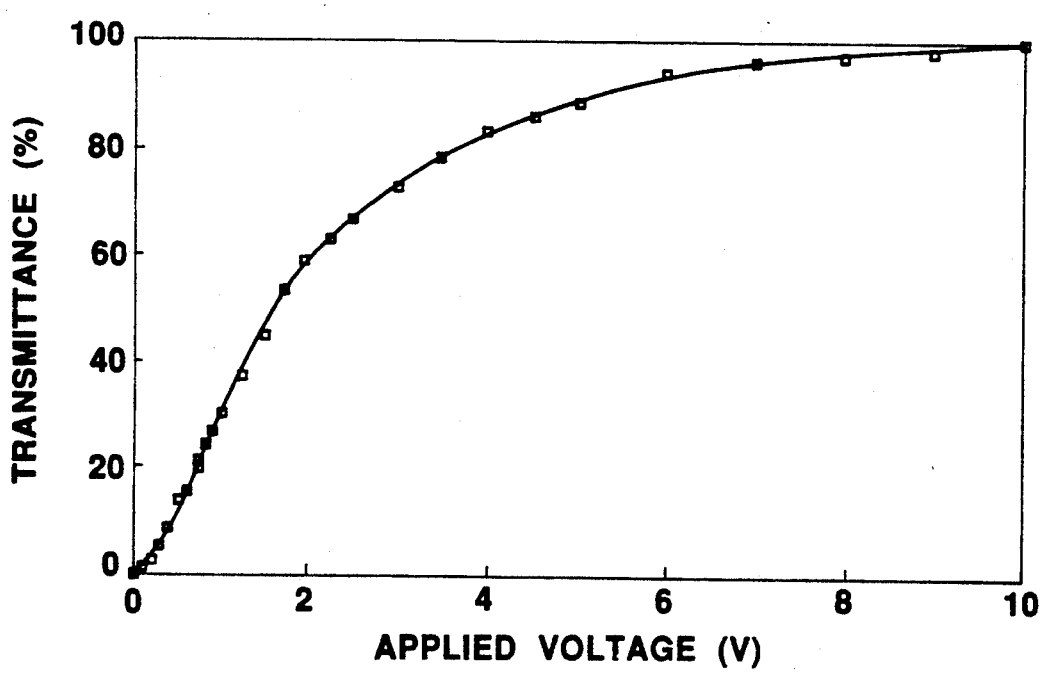
FIG. 12 is a diagram showing the relation between the applied voltage and the light transmittance in the liquid crystal cell of the monodomain structure.

With the liquid crystal of the monodomain structure, the contrast ratio of 81 was achieved, while the analog gradation exhibited excellent linearity within the low voltage range as shown in FIG. 12.

With the liquid crystal cell of the monodomain structure, an analog gray-scale display device having the response time of the order of 1 msec and with the high contrast could be realized by driving under the low voltage of 4 V or less.

From the foregoing it is seen that the present invention provides a liquid crystal display device employing a liquid crystal material having the chiral smectic C phase, in which the projection component on the substrate of the axis of a cone delineated by the liquid crystal molecule and the projection component on the substrate of the axis of the liquid crystal molecule itself, are identical with the processing direction for uniaxial orientation of the substrate, and in which this state is to be the initial monostable state, so that analog gray-scale display is assured and high speed response characteristics are superior.

Above all, by turning the liquid crystal material into the monodomain structure, the contrast ratio and linearity in the analog gray-scale in the low voltage range may be improved significantly.

The liquid crystal display device of the present invention may be applied to the device having a chiral smectic C phase with a longer pitch length so that the orientation of the liquid crystal molecules may be facilitated with a significant advantage in mass production.

In addition, with the liquid crystal display device of the present invention, the driving waveform electrically neutral conditions may be employed and, since this driving waveform is identical with the TN type TFT display, it becomes possible to achieve a high speed gray-scale display by amplitude modulation by TFT active matrix driving.

Although other modifications and changes may be suggested by those skilled in the art, it is the intention of the inventors to embody within the patent warranted hereon all changes and modifications as reasonably and properly come within the scope of their contribution to the art.

What is claimed is:

1. A liquid crystal display device, comprising:
   a pair of substrates each provided with an aligning layer having a processing direction for uniaxial orientation, the processing directions being substantially anti-parallel to each other, a distance between said pair of substrates being in a range of 1.2 to 3 μm;
   a liquid crystal mixture having a helical pitch of more than 2 μm in the chiral smectic C phase at ambient temperature, said liquid crystal mixture including at least one non-chiral component having at least one heterocyclic ring, said liquid crystal mixture being charged into a space between said pair of substrates in isotropic or chiral nematic phase and then cooled slowly to ambient temperature so that a projection component on said pair of substrates of an axial direction of a cone delineated by liquid crystal molecules of said liquid crystal mixture and a projection component on said pair of substrates of an axial direction of the liquid crystal molecules are in a same direction as the processing directions for orientation of said pair of substrates and thereby defining a state that is monostabilized as an initial state, a tilt angle of said liquid crystal molecules being continuously variable to one of a positive and a negative sense from a direction of monostable state in accordance with the strength and polarity of an applied electric field.

2. The liquid crystal display device according to claim 1 wherein the liquid crystal mixture having the chiral smectic C phase is composed of chiral liquid crystals and non-chiral liquid crystals, said non-chiral liquid crystals being phenylpyrimidine liquid crystals and/or tricyclic difluorine liquid crystals.

3. The liquid crystal display device according to claim 1 wherein the amount of the chiral component in said liquid crystal mixture is 1 to 3 wt %.

4. The liquid crystal display device according to claim 1 wherein said aligning layer is of polyimide derivatives.

5. The liquid crystal display device according to claim 1 wherein the liquid crystal mixture charged between said pair of substrates is in the monodomain structure having inclined bookshelf layer structurally by having applied an alternating electric field at the temperature of the N* phase and cooling the liquid crystal to the SmA phase and then to the SmC* phase under the continued application of the electric field.

* * * * *